US012375744B2

(12) United States Patent
Correa et al.

(10) Patent No.: US 12,375,744 B2
(45) Date of Patent: Jul. 29, 2025

(54) VIDEO STREAMING PLATFORM

(71) Applicant: 12AM Worldwide, Inc., Encino, CA (US)

(72) Inventors: Frank Correa, Los Angeles, CA (US); Sarah Rundell Hakenson, Los Angeles, CA (US); Harrison Tobin, Flower Mound, TX (US)

(73) Assignee: 12AM Worldwide, Inc., Encino (CA)

( * ) Notice: Subject to any disclaimer, the term of this patent is extended or adjusted under 35 U.S.C. 154(b) by 260 days.

(21) Appl. No.: 17/528,593

(22) Filed: Nov. 17, 2021

(65) Prior Publication Data
US 2022/0159327 A1    May 19, 2022

Related U.S. Application Data

(60) Provisional application No. 63/115,765, filed on Nov. 19, 2020.

(51) Int. Cl.
*H04N 21/266*  (2011.01)
*H04N 21/231*  (2011.01)
*H04N 21/422*  (2011.01)
*H04N 21/482*  (2011.01)
*H04N 21/81*   (2011.01)

(52) U.S. Cl.
CPC ..... *H04N 21/266* (2013.01); *H04N 21/23109* (2013.01); *H04N 21/42203* (2013.01); *H04N 21/4222* (2013.01); *H04N 21/4826* (2013.01); *H04N 21/812* (2013.01)

(58) Field of Classification Search
CPC .......... H04N 21/266; H04N 21/23109; H04N 21/42203; H04N 21/4222; H04N 21/4826; H04N 21/812; H04N 21/233; H04N 21/251; H04N 21/25891
See application file for complete search history.

(56) References Cited

U.S. PATENT DOCUMENTS 8,015,005 B2   9/2011   Ma
8,543,622 B2   9/2013   Giblin
8,589,990 B2   11/2013  Dashevskiy
(Continued)

FOREIGN PATENT DOCUMENTS

CN    102740143 B    8/2014
CN    104199896 B    9/2017
(Continued)

*Primary Examiner* — Nathan J Flynn
*Assistant Examiner* — Christine A Kurien
(74) *Attorney, Agent, or Firm* — Jordan IP Law, LLC

(57) ABSTRACT

A method and system for organizing and retrieving videos including a network, a video display unit and a telephone configured to selectively act as a remote control for the display unit. A video database is located on a platform connected to the network configured to load videos into the database by detecting video type, so that the videos are configured to be searched and indexed by video type, channel and ranking A voice control system processes voice commands and produces results for the search that are weighted based on characteristics of the person requesting the search, and displays results including videos, ranked in order of relevance, suggested searches and advertisements to the user. An AI engine located on the platform is operatively connected to the video database and is configured to re-rank the videos.

18 Claims, 14 Drawing Sheets

(56) References Cited

U.S. PATENT DOCUMENTS

| | | |
|---|---|---|
| 9,043,841 B2 | 5/2015 | Kuo |
| 9,165,069 B2 | 10/2015 | Tseng |
| 9,836,437 B2 | 12/2017 | Wiitala |
| 9,866,913 B1 | 1/2018 | Wang |
| 9,948,980 B2 | 4/2018 | Glazier |
| 10,031,647 B2 | 7/2018 | Scott |
| 10,402,436 B2 | 9/2019 | Berg |
| 10,628,741 B2 | 4/2020 | El Kaliouby |
| 2009/0164460 A1 | 6/2009 | Jung |
| 2013/0276042 A1* | 10/2013 | Savastianov .......... H04L 65/611 725/95 |
| 2014/0067402 A1 | 3/2014 | Kim |
| 2014/0108009 A1 | 4/2014 | Chang |
| 2014/0373063 A1* | 12/2014 | Funk .................... H04N 21/432 725/44 |
| 2015/0331583 A1* | 11/2015 | Zhang ................... G06F 3/0484 715/825 |
| 2017/0169040 A1 | 6/2017 | Guan |
| 2018/0262793 A1 | 9/2018 | Lau |
| 2019/0349619 A1* | 11/2019 | Hou ......................... G06N 3/08 |
| 2020/0007932 A1* | 1/2020 | Zavesky .......... H04N 21/44016 |
| 2021/0026523 A1* | 1/2021 | Jamison ................ G06F 40/186 |

FOREIGN PATENT DOCUMENTS

| | | |
|---|---|---|
| CN | 108235145 | 6/2018 |
| CN | 105183897 B | 9/2018 |
| CN | 108804647 | 11/2018 |
| WO | WO2020157283 | 8/2020 |

\* cited by examiner

VIDEO STREAMING PLATFORM

CROSS REFERENCE TO RELATED APPLICATIONS

This application claims the benefit of U.S. Provisional Application Ser. No. 63/115,765 entitled, "Video Streaming Platform" and filed on Nov. 19, 2020. The entire contents of which is incorporated herein by reference.

TECHNICAL FIELD

The present invention relates to methods and systems for organizing and retrieving videos.

BACKGROUND

The presentation of television and movie videos has changed over time. In the past, one would choose a movie video to view based on reviews or print media. Once a video was chosen, one would then travel to a movie theater at a specific time to see a specific movie video. Some movie videos were also available on television, again on a specific channel and at a specific time. Often presentation times and channels of movie videos or television videos would be published. For example, a television guide would list videos organized by numerically ordered television channels and the associated start times for each video. A viewer could then use a controller to tune into a particular channel at a specified time listed in the television guide.

Communication speeds have increased over the years. With the introduction of the internet, information can be transmitted and received at extremely high speeds to individual households. Early videos were presented on film, stored on reels and shown in movie houses or transmitted to household televisions. Videos are now being stored as digital files. Since digital files can be transmitted upon request of a viewer, movies can now be viewed on-demand. Also, since the storage capacity of the internet is extremely large, almost any video can be seen on-demand of a viewer. As such, the listing of videos based on television channel and start time has become obsolete, since videos can start at any time. Also, television controllers, which historically could be used adjust a television channel, have also become essentially obsolete since videos are not always transmitted on a channel, but rather are typically transmitted through the internet to a particular display unit. Often videos are downloaded to different types of display units, a common display unit being the smartphone.

To address some of these issues, U.S. Patent Application Publication No. 2017/0169040, incorporated herein by reference, sets forth a method for recommending a video. The method includes categorizing and ranking videos in various categories according to a degree of popularity for each video. A preference value is analyzed for each of the categories with user identities according to a browsing history. One or more videos is selected from each of the categories and sent to a terminal device display according to the preference value for each of the categories of the user and the ranking result. However, this method does not address all of the problems generated by an on-demand video system. For example, the rankings may not be as accurate as desired.

U.S. Pat. No. 10,031,647, also incorporated herein by reference, provides universal remote media control, across multiple platforms, devices and users. A specialized protocol allows a media controller (such as computer or mobile device) to have access to running activities (such as a television show playing on a media player). However, this protocol is not designed to work in combination with an on-demand video system to provide recommendations.

Each of U.S. Pat. Nos. 8,015,005 and 8,543,622, which are further incorporated herein by reference, discloses a communication device for enabling voice searching and content retrieval. Again, such a system does not necessarily work in combination with an on-demand video system to provide recommendations.

With the above in mind, in one aspect, there still exists a need in the art for an advanced system for organizing and retrieving videos. In another aspect the problems set forth above could be addressed by employing a smart phone as an advanced controller to retrieve videos in real time, while enabling commands to be easily accepted from a viewer to control a television or other display device. Finally, there also exists a need for and advanced voice-based control system for searching and retrieving videos.

SUMMARY OF THE INVENTION

The present invention is directed to a system and method for organizing and retrieving videos. The overall invention will be described with specific reference to three preferred embodiments of the invention.

The first embodiment is directed to a video streaming platform for organizing and retrieving videos wherein a video database is searched and indexed by video type, channel, ranking, etc. The channels are re-ranked by an AI engine and output to a user. The method includes detecting video type, attaching additional content based on video type for primary and secondary screens, parsing videos into channels and subchannels based on type or category, ranking the channels by relevance, and then rearranging the channels.

The second embodiment relates to a smartphone that performs as a normal phone in a stand-alone mode or acts as a remote for a television device when the television device and the smartphone are on the same network. When acting as a remote, the smartphone controls such features as play, pause, stop, fast forward and rewind. The smartphone is preferably able to search for shows using a voice command and provide a second screen experience The third embodiment sets forth an advanced voice control system used to search for information regarding videos. More specifically, a voice query is processed into text. The text is parsed into classifications and sent to a search engine. Search results are weighted based on characteristics of the person requesting the search. Results including suggested videos along with suggested searches and advertisements related to the results are displayed.

Various expansions to the systems are also employed wherein both channels and subchannels port sub-content to a standalone electronic commerce or electronic discovery application for mobile devices and the world wide web. The platform will provide an output not only for a video display with second screen experience but also output for a main application and sub applications. Essentially, the platform will, in general, subdivide any grouping of channels or information.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

The disclosure may be more completely understood in consideration of the following description of various illustrative embodiments in connection with the accompanying drawings.

DETAILED DESCRIPTION OF PREFERRED EMBODIMENTS

Figure 1:
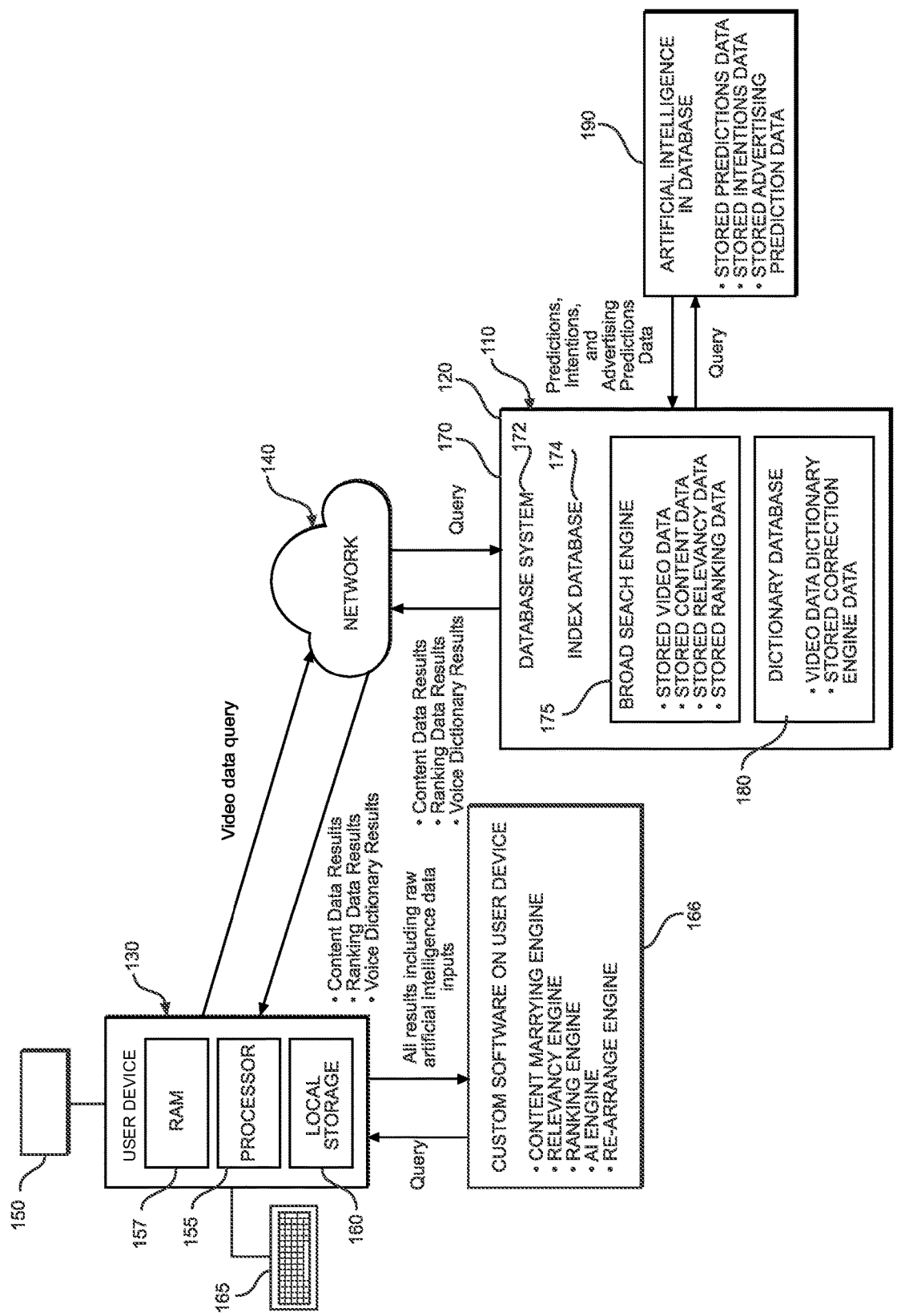
FIG. 1 is a schematic overview of a video streaming platform according to a first preferred embodiment of the invention.

The following detailed description should be read with reference to the drawings in which similar elements in different drawings are numbered the same. The detailed description and the drawings, which are not necessarily to scale, depict illustrative embodiments and are not intended to limit the scope of the disclosure. Instead, the illustrative embodiments depicted are intended only as exemplary. Selected features of any illustrative embodiment may be incorporated into an additional embodiment unless clearly stated to the contrary. While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

As used throughout this application, the singular forms "a", "an" and "the" include plural forms unless the content clearly dictates otherwise. In addition, the term "or" is generally employed in its sense including "and/or" unless the content clearly dictates otherwise.

FIG. 1 shows an online video streaming platform 110 for retrieving videos. A software-based system 120 runs on online video streaming platform 110 and is employed to process the videos. A user device, such as a viewer's computer 130, is formed of one or more computing devices and is configured for transmitting and receiving digital information to or from the Internet 140 or another network. Viewer's computer 130 typically has a monitor 150, a central processing unit 155, some type of memory 157, local storage 160 and an input-output unit such as a keyboard 165. Typically, when in use, viewer's computer 130 would have some type of operating system, such as MACINTOSH, UNIX or WINDOWS, which would run the basic operations of viewer's computer 130. Additionally, specialized applications 166, such as a web browser, would be used to interpret the various protocols of Internet 140 into an understandable interface for the viewer. Viewer's computer 130 is configured to receive information, such as content ranking results, ranking data results, voice dictionary results, etc., from platform 110 via network 140 and to send video data queries to platform 110 via network 140. Custom software is also preferably placed on viewer's computer 130. The custom software is adaptable to different user devices, such as a mobile phone, television, tablet or website. In addition, custom software 166, local storage 160 and processor 155 operate to enable several software engines to operate on viewer's computer 130. Specifically, at least the following programs form custom software 166 residing in and running on viewer's computer 130, namely: a content marrying engine, a channel parsing engine (which parses by category), a relevancy engine, a ranking engine, artificial intelligence engine and a channel re-arrange engine, as discussed in more detail below. Custom software 166 is also configured to process video channels and associated content such that it is searchable by voice, text, artificial intelligence and a watchlist.

Viewer's computer 130 also could be in the form of a television, a smart phone or a tablet type computing device. Separate lines of communication from the viewer may be provided from the viewer's computer 130 to the video streaming platform 110. Online video platform 110 provides viewers the opportunity to watch videos on-demand online. Although only one computer 130 for a viewer is shown, numerous computers are available for multiple viewers.

Although viewer's computer 130 could be part of any data network, most preferably the computer is connected to Internet 140 or an internet service provider (ISP) by a high-speed integrated service digital network ISDN, a T-1 line, a T-3 line or any other type of communication system with other computers or ISP's which typically form Internet 140. In this way viewer's computer 130 is connected to video streaming platform 110.

Video streaming platform 110 includes hardware and memory to enable software-based system 120 to support a video database system 172 with includes an index database 174, a broad search engine 175 and a dictionary database 180. Video database system 172 is also able to communicate with or includes an artificial intelligence mechanism 190. The broad search engine 175 is able to store and retrieve video data, content data, relevancy data and ranking data. Dictionary database 180 stores a video data dictionary and correction engine data. Artificial intelligence processing system 190 stores predictions data, intentions data and advertising and prediction data.

Figure 2:
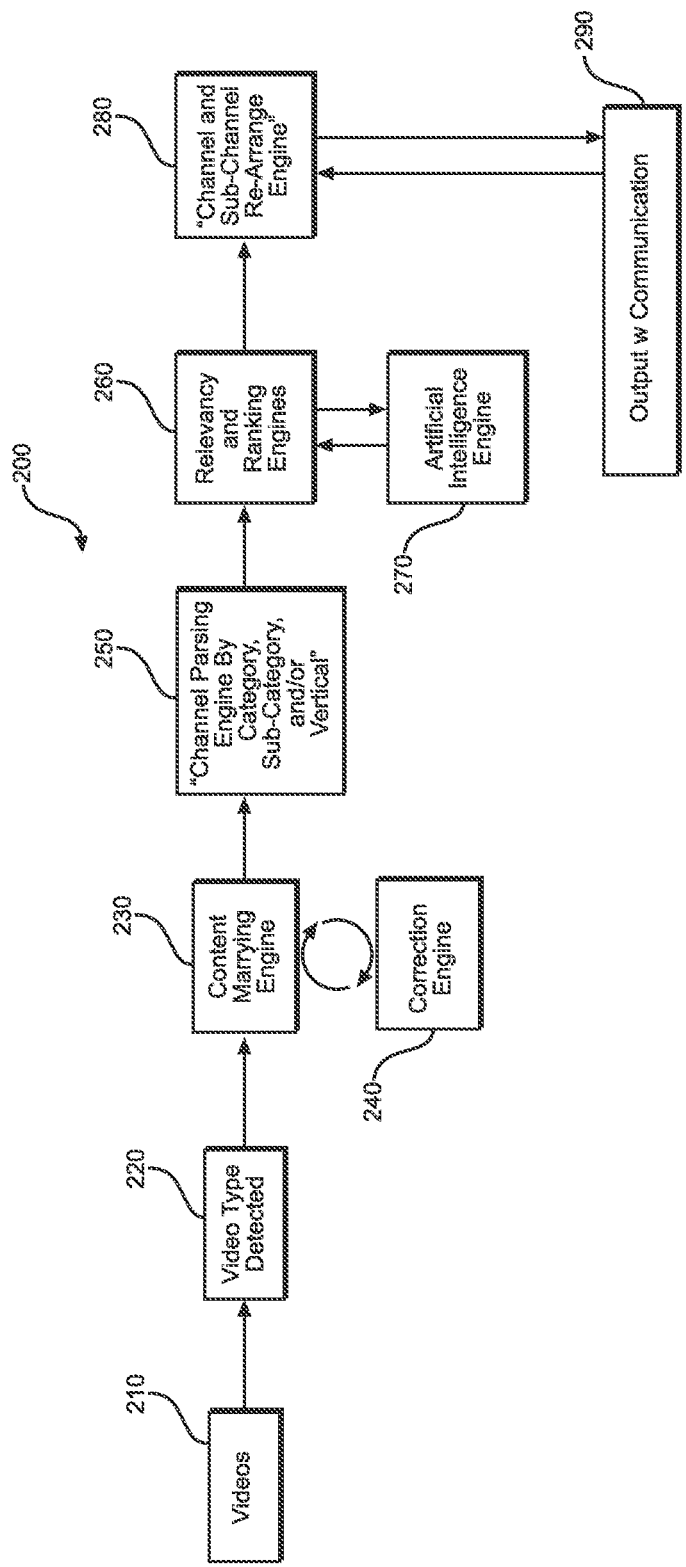
FIG. 2 is a simple flow chart showing steps performed by the video streaming platform shown in FIG. 1.

FIG. 2 illustrates an overview of a video retrieval process 200. Initially, at step 210, video database system 172 is formed by storing numerous videos in video streaming platform 110. The videos are fed into database system 172. Once the videos are loaded, the detection process begins. More specifically, the video database system 172 is searched at step 210 and the relevant metadata is placed in local storage 160.

Next, at step 220, the video type of each video is detected. Several video types may be present such as on-demand, live video feed, EPG programs, so named because they are programs from the Electronic Program Guide, stand-alone video, story and podcasts. Next, at step 230, the process employs the content marrying engine. Additional content is attached to the video data based on video type and then formatted for a primary and secondary screen experience. The content types include: tips, instructions, tutorials, annotations, comments, suggestions, recommendations, purchase options, products, advertisements, and tangential information.

A correction engine is applied, at step 240, to the search and additional content. The correction engine corrects the spelling in the metadata and stored data. The correction engine also adds nuances, terms of art and slang to the searches, the metadata and the stored data so that the metadata and stored data will be more compatible with the searches and additional data added later in the process. Preferably, the correction engine is applied to the search and additional content prior to attachment to the video data.

The next step, at 250, the videos are parsed. Videos are parsed into channels and subchannels based on type, category, sub category, and/or vertical markets. Vertical markets refer to markets such as real estate, gaining, travel, etc. With the platform, vertical market information could be replaced with information regarding a main topic, main subject and/or industry. Examples of categories include: fashion, fitness, dance, wellness, art, travel, comedy, drama, and action. Certainly, a wide variety of additional categories can be employed. For example, a fashion channel that has ladies, men's fashion and beauty categories will automatically sub-divide into a ladies' fashion channel, a men's sneakers channel and a ladies' beauty channel. Each of the main channels and sub-channels are automatically ported as standalone applications such that, at all times, a comprehensive fashion application and separate ladies' fashion, men's sneakers and beauty applications are produced. These applications are displayed in real time as the channels are formed through the algorithm.

Next, relevancy and ranking engines are applied. The channels and videos are ranked, at 260, by artificial intelligence, at 270, while considering at least the following inputs: relevancy, human curation, previous user/viewer behavior and timecode. The artificial intelligence engine generates suggestions, predictions, intentions and recommended advertisements based on the video, video related content, human curation associated with such content, and a set of internal rules.

Next a channel and subchannel re-arrange engine, at 280, again uses Artificial Intelligence to rearrange the channels, subchannels and videos by video type and by category. The preferred video types are: on-demand, live video feed, EPG programs, stand-alone video, story and podcast. By way of example, the preferred categories are fashion, fitness, dance, wellness, art, travel, comedy, drama and action. Certainly, other categories could be employed. Another example is a general gaining channel that is algorithmically subdivided into a retro gaining subchannel, a sports gaining subchannel, and story-based gaining subchannels, each with an associated standalone application that contains products for purchase, blogs, photographs, tips, tutorials, etc. This subdividing is preferably completed with the content marrying engine and the channel parsing engine, which can parse by category, sub-category and vertical market information and the channel re-arrange engine which can parse by channel and subchannel.

The system then provides communication output, at 290, to various display devices, such as viewer's computer 130, which represents mobile devices, televisions and server-side internet applications. The server-side applications are preferably embedded inside third-party web pages and other third-party software to display sub-content from the platform. The server-side applications can take many forms. The server-side internet applications can be embedded inside third-party web pages and other third-party software to display sub-content from platform 110 (e.g., recipes, DIY video presentations, etc.). Server-side applications pull data from the content marrying engine and the channel re-arrange engine to deploy content on third-party websites and other devices through embedded server-side code that communicates (e.g., both input and output) directly with the platform servers. For example, a server-side application could take a tutorial and embed the tutorial in a website blog, or embed recommendations in a news article. Other examples include embedding a dance story inside a website article and placing the video in a story channel under a dance category or an art based do it yourself video inside a third-party mobile app and rearranging its channel tag to be Stand-alone and as an "Art" category. The outputs include channels and content that is preferably searchable by voice commands, text, AI, and watchlist.

Figure 3:
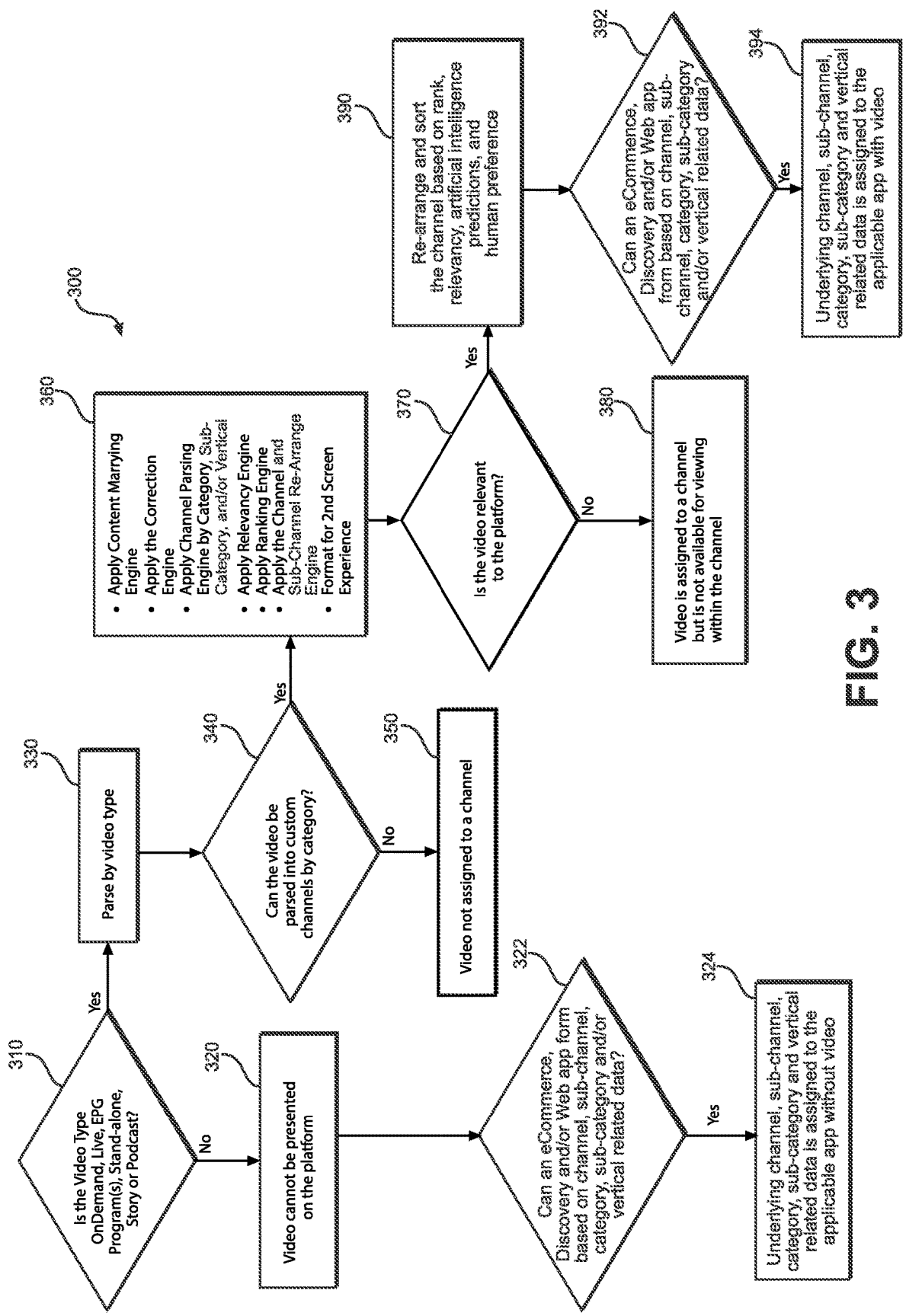
FIG. 3 is a flow chart including decision tree boxes of steps performed by the video streaming platform shown in FIG. 1.

FIG. 3 shows decision tree or flowchart which represents the logic followed by the software on the video retrieval platform 110 discussed above. Once videos are loaded into database system 172, platform 110 determines, at step 310, if the video type is one that can be processed. Specifically, if the video type is not on-demand, live, EPG programs, stand-alone or podcast then the video cannot be presented on platform 110 with those programs; however, the process then checks at 322 to see if an ecommerce discovery and/or a world wide web based, applicable application can be employed to process data related to a video and organized by channel, subchannel and/or vertical market information. Then at step 324, the underlying channel, subchannel and/or vertical market information related data is assigned to the applicable application without video.

If the video is of the type that can be processed then platform 110 parses the video at step 330. The method then determines at step 340, if the video can be parsed into custom channels by category. If not, the method does not assign a channel at step 350. However, if the video can be parsed into a custom channel, the method applies the various engines described above, at step 360. Preferably, the content marrying engine, the correction engine, the parsing engine, the relevancy engine, the ranking engine and the channel rearrange engine are applied. As noted above the content marrying engine and the channel parsing engine can parse by category, sub-category and vertical market information, and the channel re-arrange engine can parse by channel and subchannel.

Then the video is formatted for the second screen experience. The platform then determines if the video is relevant at 370. If so, the platform rearranges and sorts the channel at step 380 based on rank relevancy, artificial intelligence predictions and human preference. If not, the platform assigns the video to a channel at step 390 but the video is not available for viewing within the channel Next, at step 392, the platform the determines if an ecommerce discovery and/or web application can form based on channel, subchannel, category, sub-category and/or vertical market related data. If so, at 394, the underlying channel, sub-channel, category, sub-category and vertical market related data is assigned to the applicable application along with video data.

Figure 4:
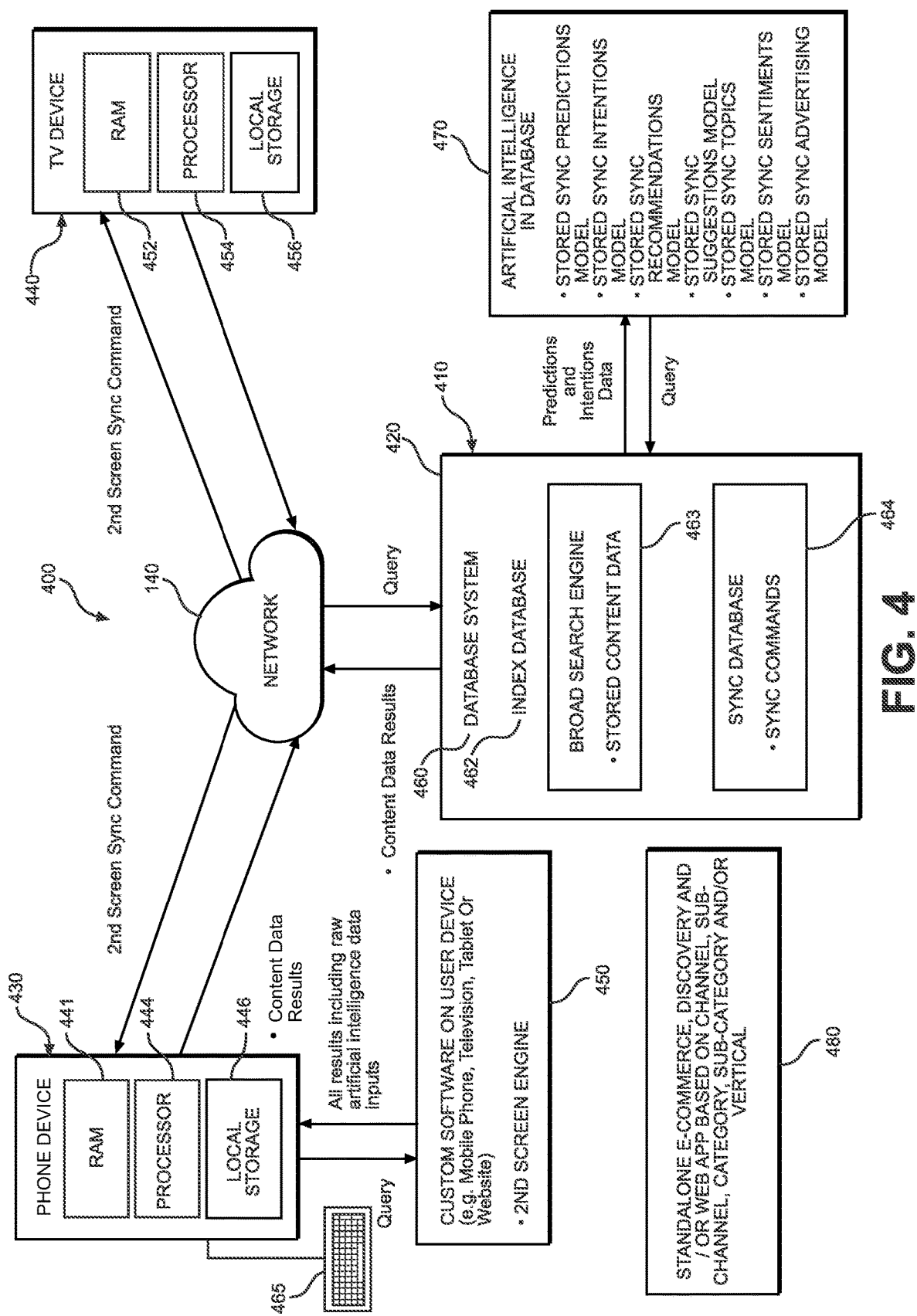
FIG. 4 is a schematic overview showing a system of employing a telephone as a remote control for a television according to a second preferred embodiment of the invention.

FIG. 4 discloses another preferred embodiment directed to a second screen experience that also has an online video streaming platform 410 for retrieving videos. Here, a software-based system 420 runs on online video streaming platform 410 and is employed to process the videos. A user device, such as a viewer's smart phone 430, is configured for transmitting and receiving digital information to and from Internet 140 or to and from another network while a television or similar device 440 for displaying videos is also connected to the Internet or network 140. Viewer's smart phone 430 has random access memory 441, a central processing unit 444, some type of memory or local storage 446 and an input-output unit such as a keyboard 165. Viewer's smart phone 430 has some type of operating system installed such as APPLE OS, or ANDROID. Additionally, specialized applications 450 such as a second screen engine also operate on smartphone 430. Viewer's smart phone 430 is configured to receive information such as content data, search results including raw artificial data inputs and other information from platform 410 via network 140 and to send video data queries to platform 410 via network 140 and second screen commands to television device 440. Custom software is also preferably placed on viewer's smart phone 430. The custom software is adaptable to different user devices such as mobile phone, a television, tablet or a website and operates software engines such as those described above with reference to viewer's computer 430.

Video streaming platform 410 includes hardware and memory to enable software-based system 420 to support a video database system 460 which includes an index database 462 and a broad search engine 463 with stored content data. A sync database 464 with sync commands. The video database system 460 is also able to communicate with or includes an artificial intelligence mechanism 470. Artificial intelligence processing system 470 stores a sync predictions model, a sync intentions model, a sync recommendations model, a sync suggestions model, a sync topics model, a sync sentiments model and a sync advertising model. These models are configured to respond to queries from database system 420 with predictions and intentions data.

Television device 440 is configured to display videos received from video streaming platform 410 via network 140 based on second screen sync commands received from viewer's smart phone 430 via network 140 or directly from viewer's smart phone 430. Television device 440 has a set of random-access memory 452, a processor 454 and local storage 456. Preferably television device 440 has some or all of the capabilities as viewer's computer device 130, described above with reference to FIG. 1.

In addition, a standalone applicable application which preferably is based on electronic commerce, discovery or the world wide web, is provided. The application is chosen to process data based on channel, subchannel, category, or subcategory and/or vertical market information as shown, at 480.

Figure 5:
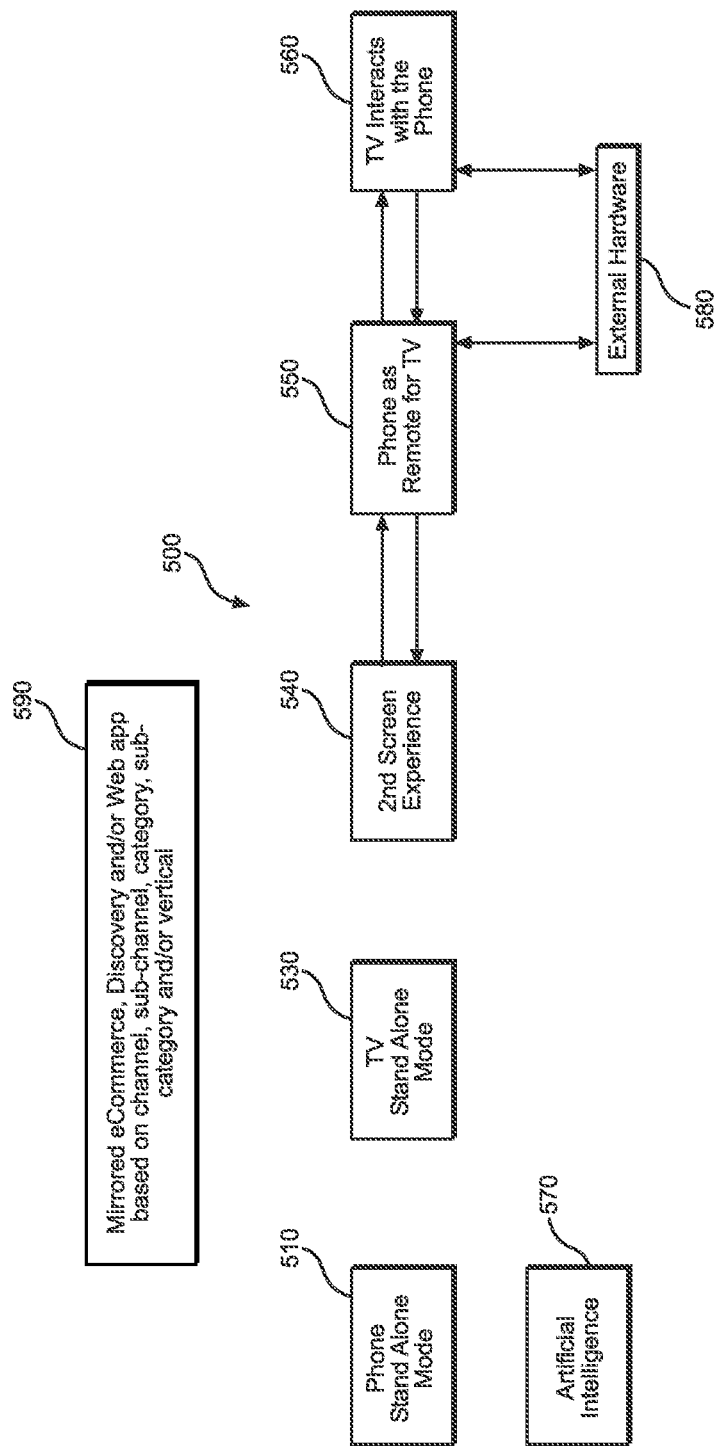
FIG. 5 is a simple flow chart showing steps performed by the system shown in FIG. 4.

FIG. 5 shows a flowchart related to the second screen experience. Smartphone 430 can act in a stand-alone mode 510. In a stand-alone mode 510, smart phone 430 acts independently from television device 440 and has all the functions of a standard smartphone. Likewise, television device 440 also is configured to act in a stand-alone mode 530 and has all the functions of a standard television. However, once the second screen experience 540 is activated and when viewer's smart phone 430 and television device 440 are connected, viewer's smart phone 430 shows the same video content as television device. The second screen engine smart phone 430 with television device 444 based on video content, metadata, U.I. design, filter effects and animation, scrolling actions and navigation.

Viewer's smart phone 430 acts as a remote control 550. Viewer's smart phone 430 acts as a remote for television device 440 when both are on the same network 140 which could be e.g., Wi-Fi, Bluetooth, etc. At least the following features are supported: Play, Pause, Stop, Fast Forward, Rewind, etc. Advanced features are also supported. For example, smart phone 430 will allow a user to advance a displayed scene or rewind the displayed scene based on synced metadata. Also, when a user is scrolling menus on viewer's smart phone 430, the menus on television device 440 scroll with the same visual graphics and images. Voice and general search results are displayed on both viewer's smart phone 430 and television device 440 in real time. Also, graphic and U.I. elements are in sync.

While television device 440 interacts, at 560, with smartphone 430, television device 440 and responds to command sent from viewer's smart phone 430, television device 440 also acts independently as a standalone television. Changes on television device 440 are sent back to the phones 430 such as those in the areas of video, audio, scrolling, metadata, navigation, visual effects, animation, and U.I. design. The experience also includes an artificial intelligence aspect 570 which will make recommendations to the user based on general searches, voice searches, watchlist behavior, and product views. The recommendations may be of products, advertisings, tips, annotations, stories, sub-Stories, podcasts, interviews, blogs, do it yourself (DIY) instructions, recipes, etc. Artificial intelligence 570 preferably communicates with the content marrying engine of the video streaming platform described above.

External hardware 580 is optionally provided. External hardware may provide output in the form of metadata to the television device 440. The metadata could include heart rate, distance, calories burned etc. External hardware 580 could be a smart watch; a smart exercise machine (spin bike, rowing machine, treadmill, resistance bands, etc.); a heat monitor; and other similar devices. Also, separate applications are optionally displayed. For example, a standalone applicable application which preferably an electronic commerce, discovery or world wide web based, is provided. The application is chosen to process data based on channel, subchannel, category, or subcategory and/or vertical market related information, as shown at 590.

Figure 6:
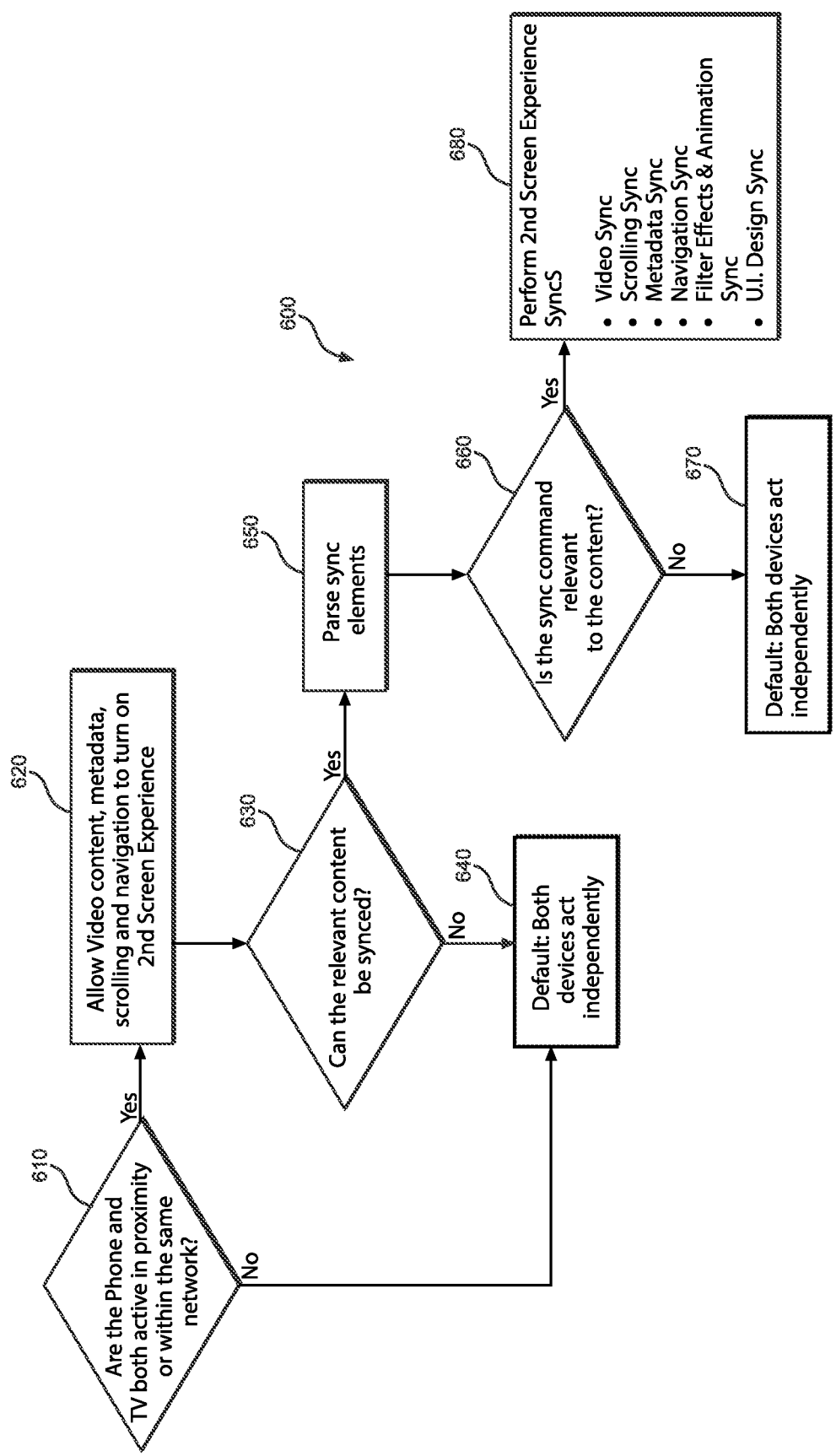
FIG. 6 is a flow chart including decision tree boxes of steps performed by the system shown in FIG. 4.

FIG. 6 shows a flowchart showing decision trees in the process 600. Starting at step 610 the system checks to see of both viewer's smart phone 430 and television device 440 are both active on the same network 140 or are both in proximity with each other. If so, system 410 allows at 620, video content, metadata, scrolling, and navigation to turn on the second screen experience. System 410 then checks, at step 630, to see if the relevant content can be synchronized. If not, system 410 reverts to a default mode, at step 640, wherein both devices act independently. This default mode is also entered if smartphone 430 and television device 440 are not in proximity or on the same network 140 at step 610.

Figure 7:
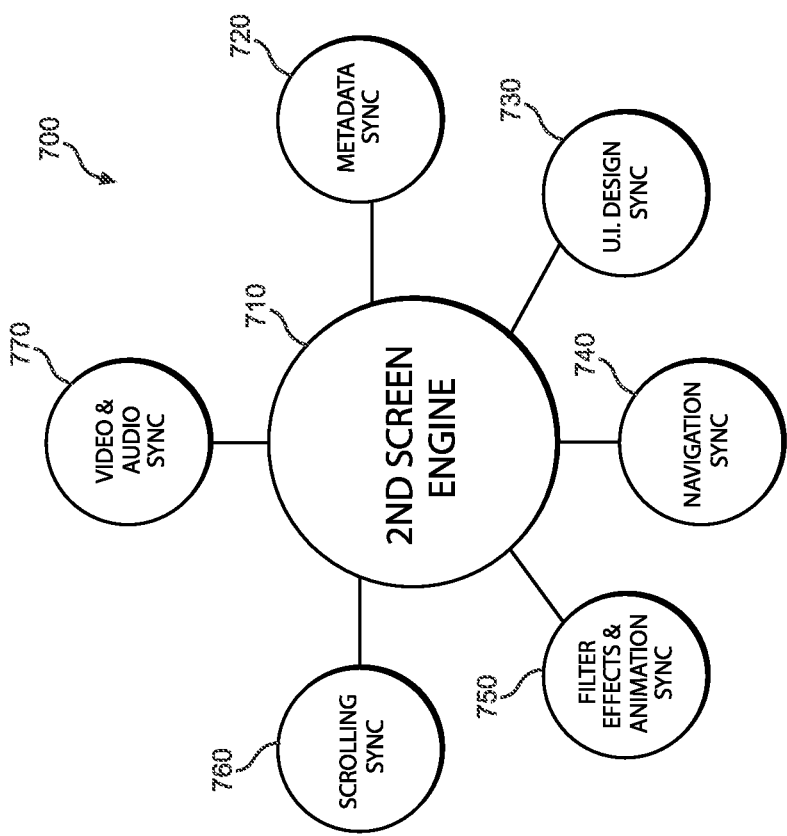
FIG. 7 shows a second screen feature of the system of FIG. 4.

If content can be synchronized at step 630, system 410 parses the elements to be synchronized at 650. If the command is not relevant to the content at step 660, the devices act independently at step 670. However, if the command is relevant to the content, then system 410 performs several synchronizing activities at 680. These activities 700 are best seen in FIG. 7 wherein an engine 710 synchronizes metadata 720, user interface 730, navigation 740, filter effects and animation 750, scrolling 760, and video and audio 770.

Figure 8:
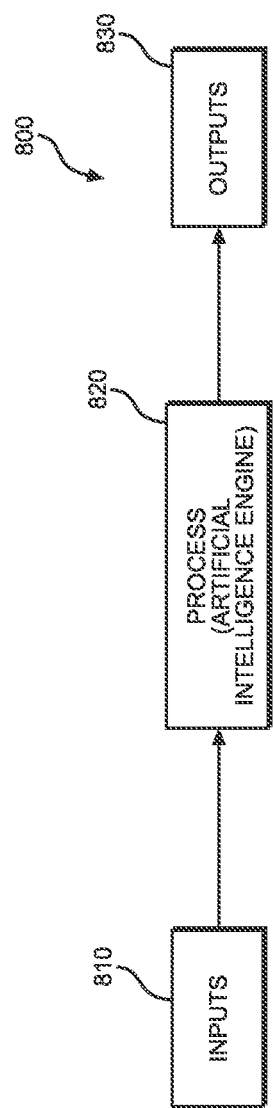
FIG. 8 is a simple flow chart showing an artificial intelligence feature of the system of FIG. 4.

FIG. 8 shows an expanded view of the artificial intelligence engine 800. The inputs 810 to engine 800 preferably include: user behavior, content metadata, and database content. These inputs 810 are then processed in a model 820 so that content metadata and related database content are searched, based on user behavior, in model 820. Emphasis in model 820 is weighted in favor of curated recommendations. The outputs 830 from model 820 are displayed in relation to the video or audio playing as relevant to the timecode as predictions are made from the artificial intelligence engine. Once again, expert curated recommendations are given weight over artificial intelligence recommendations. The output actions include: intent action (e.g. Scroll to relevant item, go to this section of the page, show a select object, etc.); recommendations; suggestions; topic considerations; sentiments (e.g. a point of view on the retrieved data, could be positive or negative); and advertisements.

Figure 9:
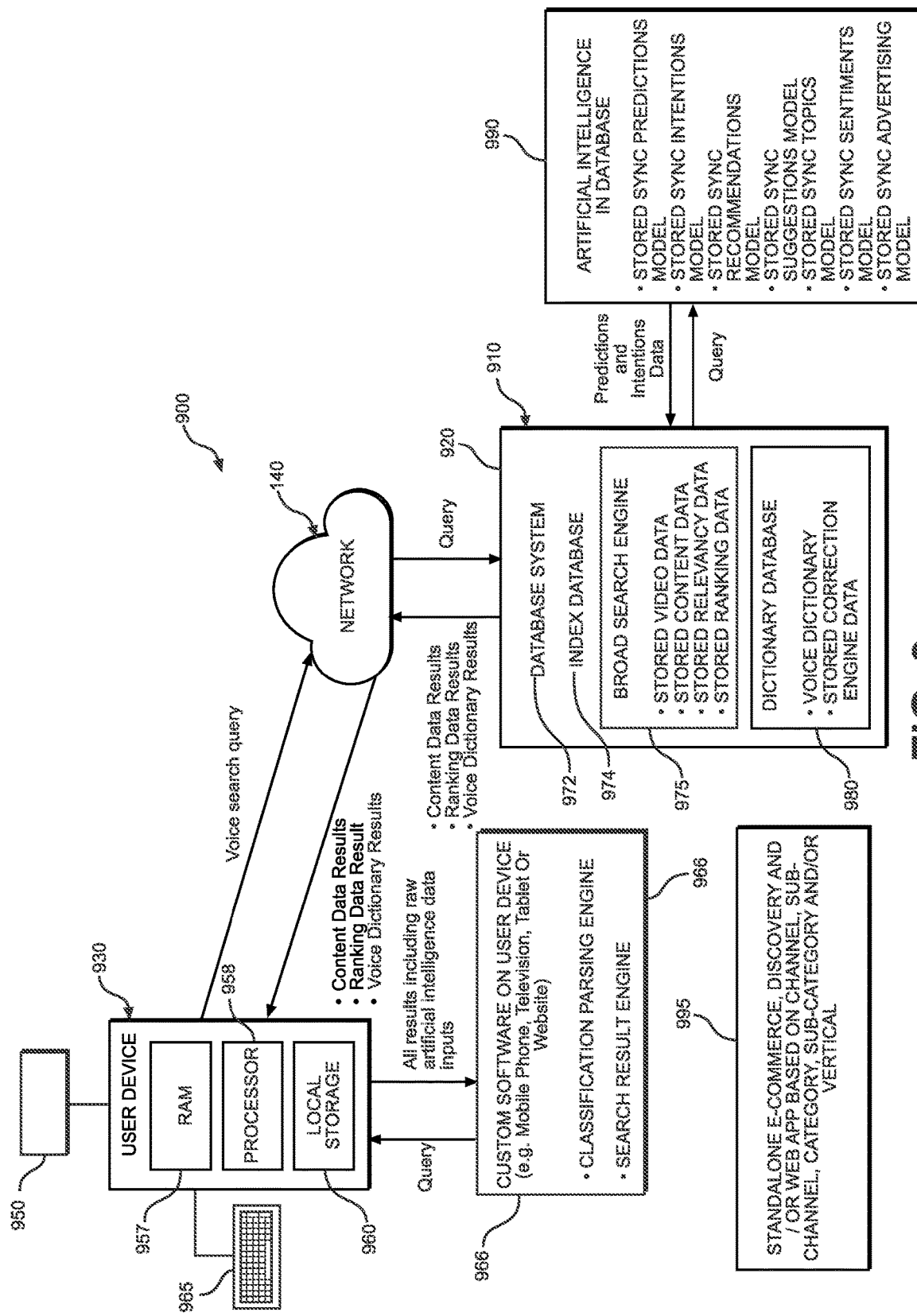
FIG. 9 is schematic overview of the system showing an advanced voice control system according to a third preferred embodiment of the invention.

FIG. 9 discloses another preferred embodiment directed to an advanced voice search 900 associated with an online video streaming platform 910 for retrieving videos. A software-based system 920 runs on online video streaming platform 910 and is employed to process the videos. A user device, such as a viewer's computer 930, is formed of one or more computing devices and includes an input-output unit for transmitting and receiving digital information such as a video data query to or from Internet 140 or another network. Viewer's computer 930 typically has a monitor 950, a central processing unit 955, some type of memory 957 or local storage 960 and an input-output unit such as a keyboard 965. Typically, when in use, viewer's computer 930 would have some type of operating system such as MACINTOSH, UNIX or WINDOWS which would run the basic operations of viewer's computer 930. Additionally, custom software 966 such as a web browser would be used to interpret the various protocols of Internet 140 into an understandable interface for a computer user, namely the viewer. Viewer's computer 930 is configured to receive information such as content ranking results, ranking data results, voice dictionary results, etc. from platform 910 via network 140 and to send video data queries to platform 910 via network 140. Custom software is also preferably placed on the computer 930. The custom software is adaptable to different user devices such as a mobile phone, television, tablet or website. In addition, the custom software 966, local storage 960 and processor 955 operate to enable several software engines to operate on computer 130. Specifically, at least the following programs form custom software 966 residing in and running on computer 930, namely the custom software includes a classification parsing engine and a search result engine.

Video streaming platform 910 includes hardware and memory to enable software-based system 920 to support a video database system with includes an index database 974, a broad search engine 975 and a dictionary database 980. The video database system 972 is also able to communicate or includes an artificial intelligence mechanism 990. The broad search engine 175 is able to store and retrieve video data, content data, relevancy data and ranking data. The dictionary database 980 stores a video data dictionary and correction engine data. The artificial intelligence processing system 990 stores predictions data, intentions data and advertising and prediction data.

The video database system 972 is also able to communicate with or includes an artificial intelligence mechanism 970. The artificial intelligence processing system 990 stores a sync predictions model, a sync intentions model, a sync recommendations model, a sync suggestions model, a sync topics model, a sync sentiments model and a sync advertising model. These models are configured to respond to queries from database system 972 with predictions and intentions data.

Also, separate applications are optionally provided. For example, a standalone applicable application which preferably an electronic commerce, discovery or world wide web based, is provided. The application is chosen to process data based on channel, subchannel, category, or subcategory and/or vertical market related information, as shown at 995.

Figure 10:
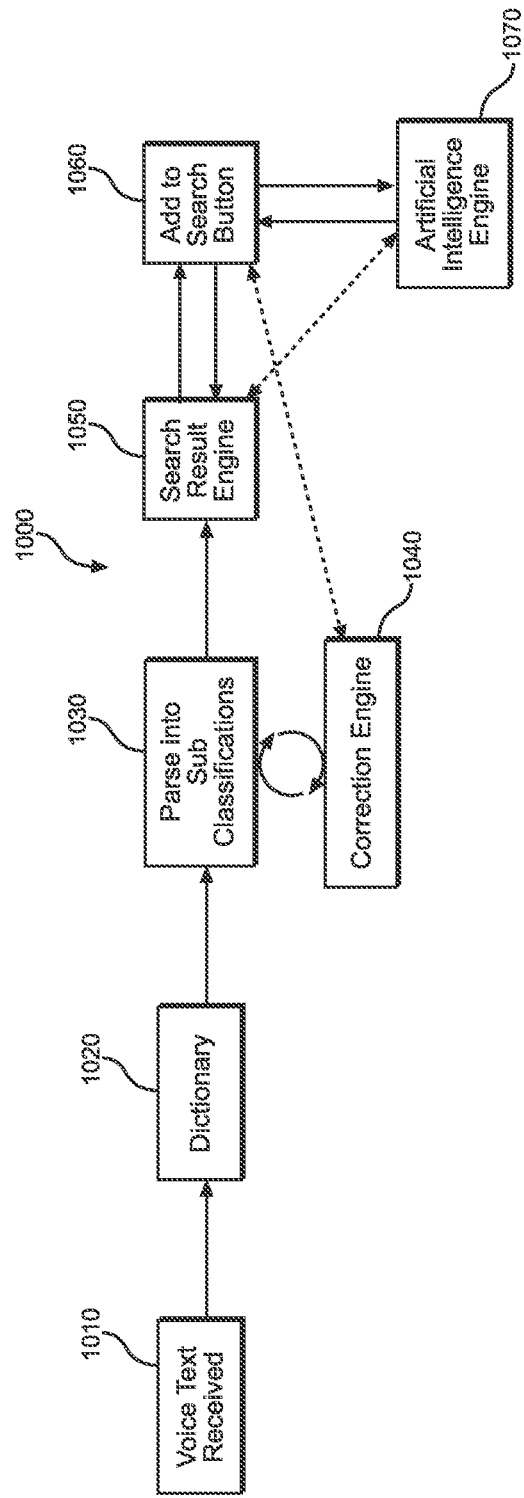
FIG. 10 is a simple flow chart showing the steps performed by the system shown in FIG. 9.

FIG. 10 shows an overview of the video retrieval process 1000. Initially, video database system 972 is formed with numerous videos located in the video streaming platform 910 in a manner similar to the embodiment shown in FIG. 1. When a voice command or inquiry is received at 1010, the voice command is converted in to text. Then, at step 1020, a dictionary is applied. Next, at step 1030, the text query is parsed into subclassifications such as: brand, category, channel, program, color, style, mood, designer, fabric, etc.

A correction engine is employed at step 1040 to the search. The correction engine will correct the spelling in the metadata and stored data. The correction engine also adds nuances, terms of art and slang to the searches and to the metadata and stored data so that the metadata and stored data will be more compatible with the searches and additional data added later in the process. Preferably the correction engine is applied to the search and additional content prior to attachment to the video data. The next step, at 1050, is a search result engine which determines results so that the results are organized based on the following criteria: human preference ranking and partially weighted by influence of the person making the recommendation. Next at 1060 an "add to search" button is generated in real time and added to the existing search text and then a new search result is added in real time. Finally, an artificial intelligence engine 1070 is employed and an artificial search suggestion button is triggered based on each search result. Related searches, intents, advertisements, annotations, terms of art, etc. are suggested.

Figure 11:
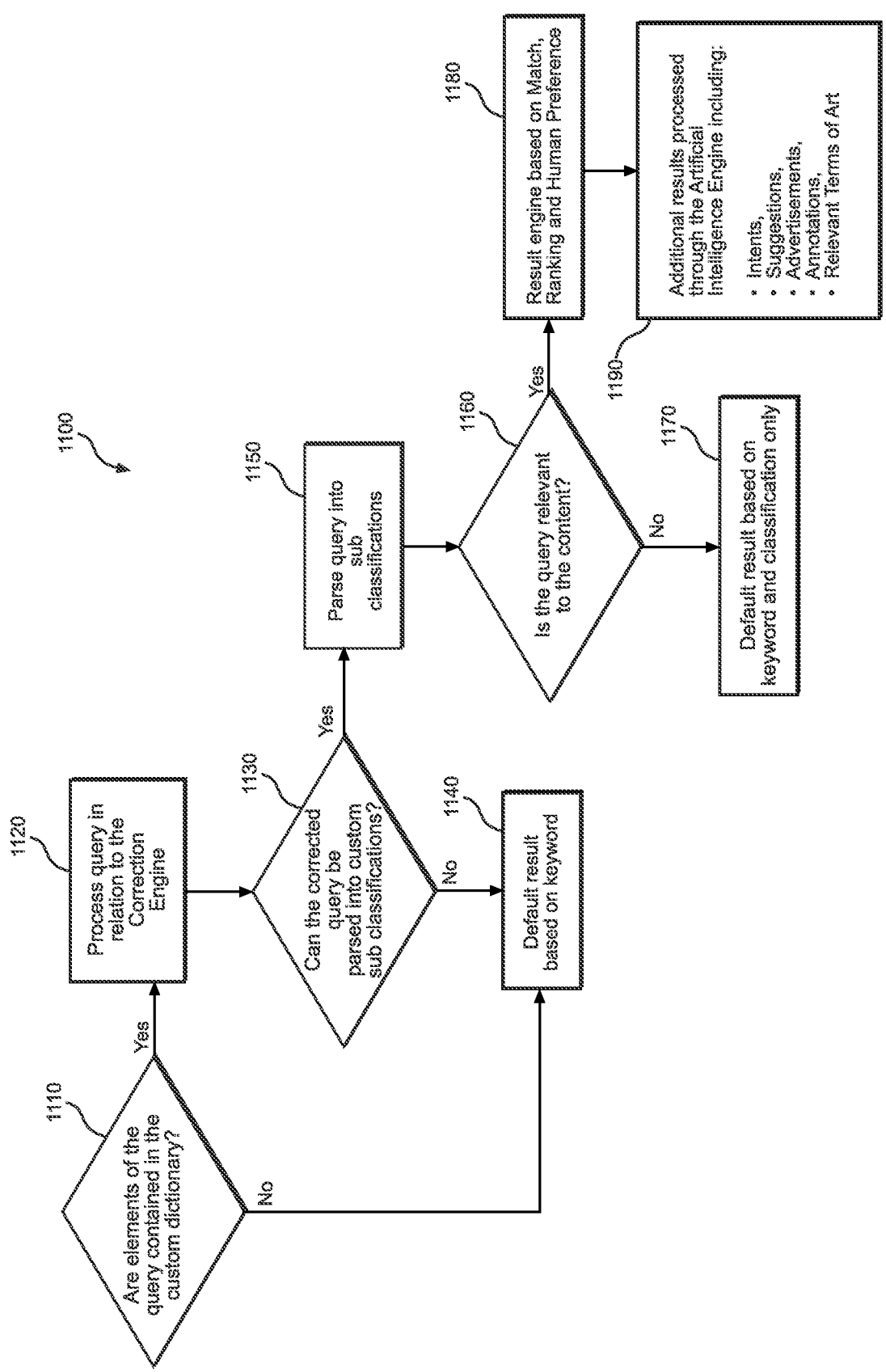
FIG. 11 is a flow chart including decision tree boxes of the steps performed by the system shown in FIG. 9.

FIG. 11 shows a flowchart showing decision trees in the process 1100. Starting at step 1110, the system checks to see if elements of the query are contained in the custom dictionary. If so, the system processes the query in relation to the correction engine at 1120. The system then checks, at step 1130, to see if the corrected query can be parsed into custom subclassifications. If not, the system reverts to a default mode at 1140 wherein a default result is determined by a keyword. This default mode is also entered if the elements are not in the custom dictionary at step 1110. If the query can be parsed at step 1130, the system parses the query into subclassifications at 1150. If the query is not relevant to the content at step 1160, the default result based on keyword and classification is provided at 1170. However, if the command is relevant to the content, then the system employs a result engine based on match ranking and human preference at 1180. Then, at step 1190, additional results are processed through the artificial intelligence engine including: intents, suggestions, advertisements, annotations, and relevant terms of art.

Figure 12:
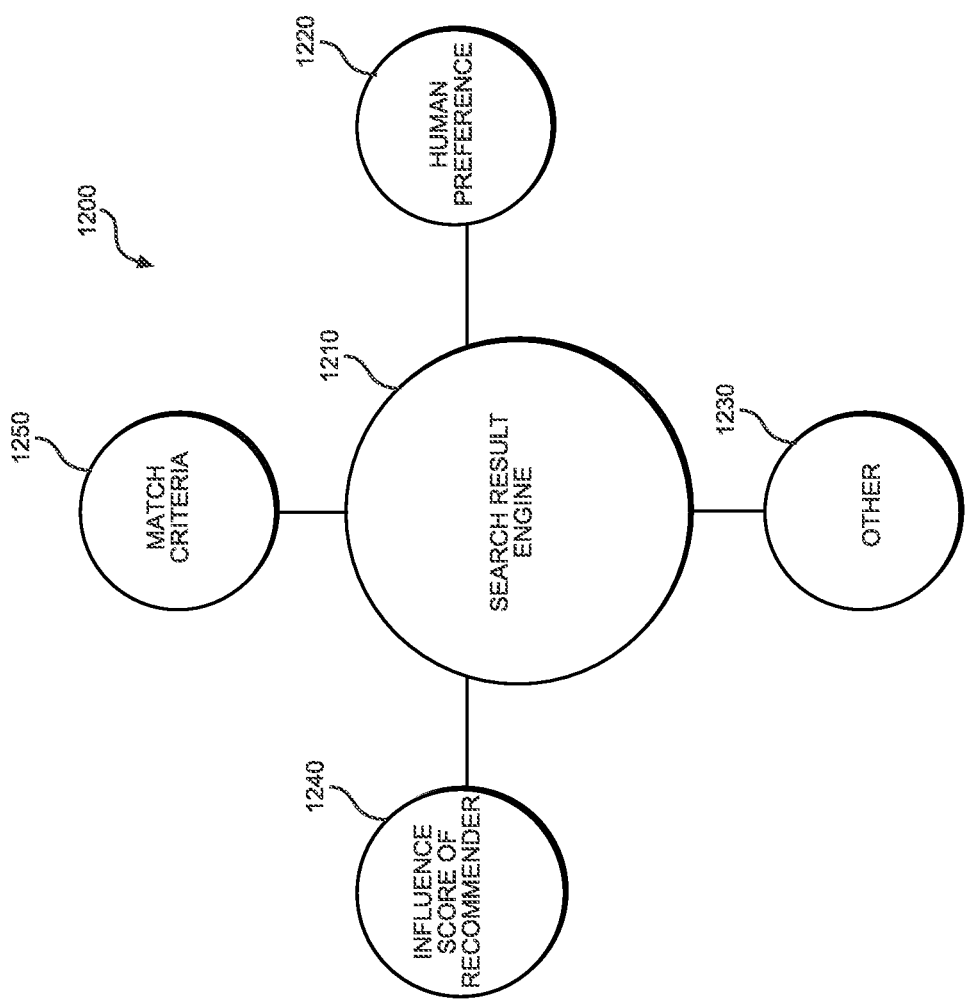
FIG. 12 shows more details of a search result engine incorporated into the system shown in FIG. 9.

The search engine system 1200 is best seen in FIG. 12 wherein the engine 1210 takes into consideration a variety of factors including human preference 1220, other items 1230, which are driven by database history and artificial intelligence, influence score of the recommender 1240 and match criteria 1250

Figure 13:
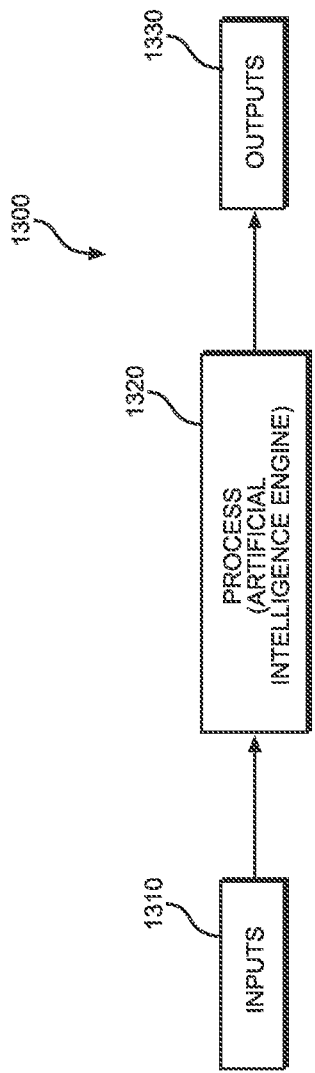
FIG. 13 is a simple flow chart showing an artificial intelligence feature of the system of FIG. 9

FIG. 13 shows an expanded view of the artificial intelligence engine 1300. The inputs 1310 to engine 1300 preferably include: voice audio and text extracted from voice audio. These inputs 1310 are then processed in a model 1320 so that content metadata and related database content are search based voice terms and phrases in model 1320. Emphasis in model 1320 is weighted in favor of curated recommendations. The outputs 1330 from model 1320 are displayed in relation to the voice inputs as predictions are made from the artificial intelligence engine. Once again, expert curated recommendations are given weight over artificial intelligence recommendations. The output actions include: intent action (e.g. Scroll to relevant item, go to this section of the page, show a select object, etc.); recommendations; suggestions; topic considerations; sentiments (e.g. a point of view on the retrieved data, could be positive or negative); and advertisements.

Figure 14:
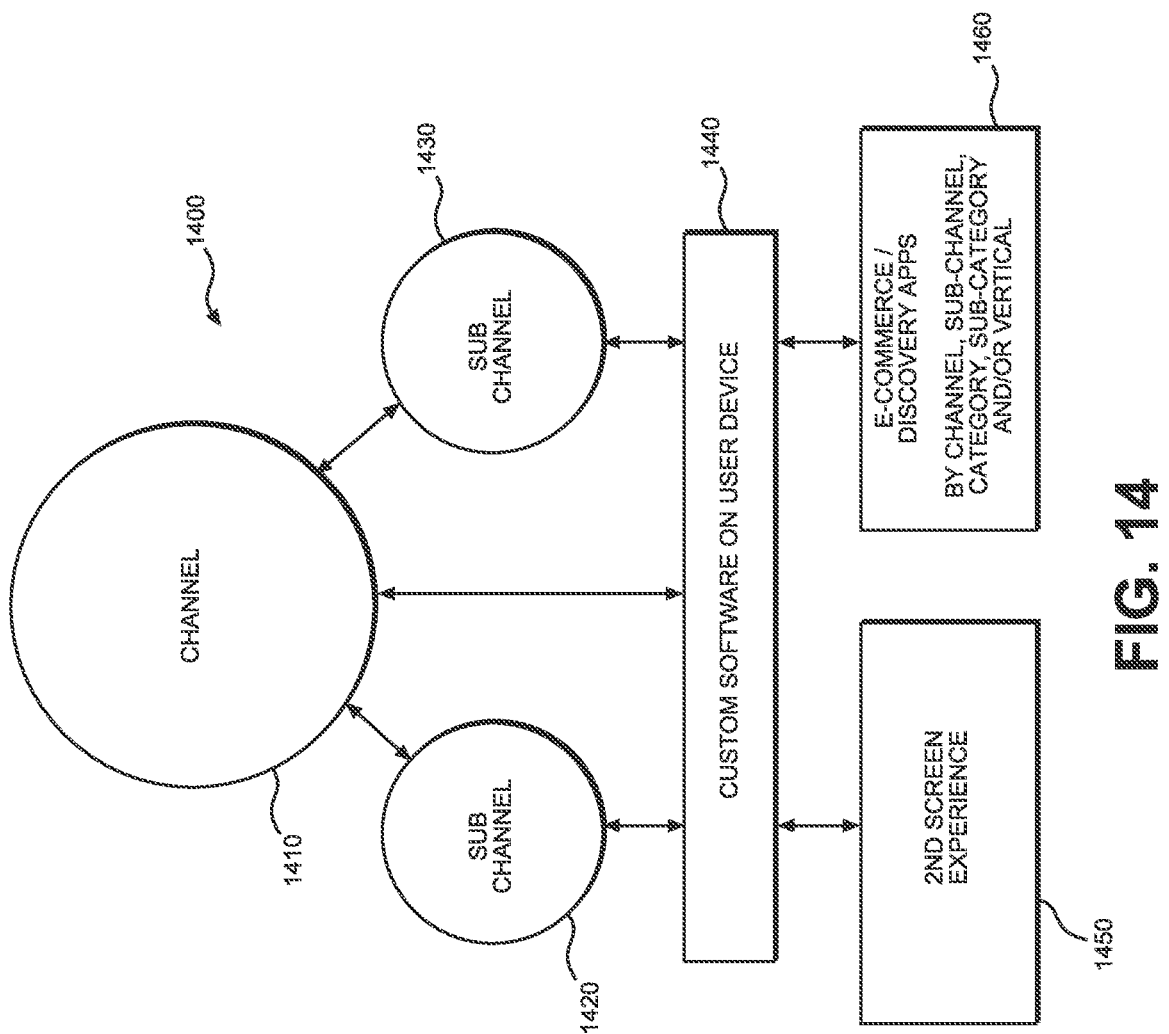
FIG. 14 is a simple schematic showing the relationship between each channel and a second screen experience or discovery applications.

FIG. 14 shows a schematic 1400 detailing how a channel 1410 is related to the various aspects of the platform 110. Content from channel 1410 may be ported to subchannels 1420, 1430 or ported to custom software 1440 on a user's mobile device. The subchannels 1420, 1430 are also preferably connected to the custom software 1440 on the user device. The custom software is connected to the $2^{nd}$ screen experience 1450 which employs the mobile device as described above and to standalone Ecommerce/discovery applications 1460 for mobile devices and for the world wide web, which also preferably operate in the mobile device. The standalone Ecommerce/discovery applications also process the channel information, as described above, to process data based on channel, subchannel, category, or subcategory and/or vertical market. The platform can provide an output not only for the existing video application with second screen experience, but also a main application and sub applications.

Based on the above, it should be readily apparent that the present invention provides an advanced system for organizing and retrieving videos, a smart phone used as an advanced controller to retrieve videos in real time, while enabling commands to be easily accepted from a viewer to control a television or other display device and an advanced voice-based search system. Each of these embodiments addresses a need in the art to more easily search for desirable videos. Although described with reference to preferred embodiments of the invention, it should be readily understood that various changes and/or modifications can be made to the invention without departing from the spirit thereof. For example, any of the features of one embodiment could be incorporated into any other embodiment.

The invention claimed is:

1. A system for organizing and retrieving videos comprising:
    a network;
    a video display unit for displaying videos to a user, said video display unit connected to the network;
    a video database located on a platform connected to the network and configured to load videos; and
    an AI engine located on the platform connected to the network, operatively connected to the video database and configured to arrange the videos,
    wherein the AI engine is configured to:
        detect a video type of each video,
        parse the videos into channels and subchannels based on the video type, and
        rank the channels by relevance, and
    wherein the platform is further configured to:
        attach additional content to each video based on the video type, wherein the video type is one of on-demand video, live video feed, EPG programs, stand-alone video, and podcasts,
        parse the videos into channels and subchannels based on category, and
        rearrange the channels so that the videos are configured to be searched and indexed by the video type, channel, subchannel and rank.

2. The system according to claim 1, further comprising a smartphone configured to selectively act as a remote control of the video display unit to control at least one of the following features on the video display unit: play, pause, stop, fast forward and rewind and act as a communications device to make remote telephone calls.

3. The system according to claim 1, wherein the platform includes a voice control system configured to process voice commands of a person requesting a search by:
    processing the voice commands into text,
    parsing the text to classifications,
    producing results for a search that are weighted based on characteristics of a person requesting the search,
    displaying results of the search, including videos, ranked in order of relevance,
    displaying suggested additional searches, and
    displaying advertisements to the person requesting the search.

4. The system according to claim 1, wherein the platform is configured to port content from the channels and sub-channels to a standalone electronic commerce application or an electronic discovery application for mobile devices or for the world wide web.

5. The system according to claim 4, wherein the platform is further configured to automatically port each of the channels and sub-channels as standalone applications.

6. The system according to claim 5, wherein the platform is configured to display the applications in real time as the channels are formed.

7. The system according to claim 1, wherein the platform is configured to divide vertical market information into the subchannels.

8. The system according to claim 1, further comprising a Content Marrying Engine and a Channel Parsing Engine configured to parse videos by category, sub-category and vertical market, and a Channel Re-Arrange Engine configured to parse the videos by channel and subchannel.

9. The system according to claim 2, wherein the platform and smart phone are configured to provide an output for a video and for a main application and sub applications on the display unit.

10. A method for organizing and retrieving videos for display on a video display unit connected to a network, said method comprising:
    loading videos into a video database located on an online platform;

rearranging the videos with an AI engine located on the platform connected to the network and operatively connected to the video database; and with the AI engine:

detecting a video type of each video;

parsing videos into channels and subchannels based on the video type;

ranking the channels by relevance;

attaching additional content based on the video type, wherein the video type is one of on-demand video, live video feed, EPG programs, stand-alone video; podcasts, parsing videos into channels and subchannels based on category; and rearranging the channels so that the videos are configured to be searched; indexed by the video type, channel and rank;

searching for video in the video database to select a video; and displaying the selected video on the video display unit.

11. The method of claim 10, further comprising controlling the display unit with a smartphone configured provide the following features: play, pause, stop, fast forward and rewind on the video display unit and to make remote telephone calls.

12. The method of claim 10 further comprising processing voice commands of a person requesting a search with a voice control system by:

processing the voice commands into text, parsing the text to classifications, producing results for the search that are weighted based on characteristics of the person requesting the search, displaying results of the search, including videos, ranked in order of relevance, displaying suggested additional searches, and displaying advertisements to a user.

13. The method of claim 11, further comprising porting content from the channels and subchannels to a standalone electronic commerce application or an electronic discovery application for mobile devices and for the world wide web.

14. The method according to claim 13, further comprising automatically porting each of the channels and sub-channels as standalone applications.

15. The method according to claim 10, further comprising providing a video feed in real time as the channels are formed.

16. The method according to claim 10, further comprising subdividing any vertical market information into channels and subchannels.

17. The method according to claim 10, further comprising parsing by category, sub-category and vertical market, and channel and subchannel with a Channel Re-Arrange Engine, a Content Marrying Engine and a Channel Parsing Engine.

18. The method according to claim 10, further comprising providing an output for a video and for a main application and sub applications on the display unit.

* * * * *